Oct. 23, 1962  R. H. TREGONING  3,059,817
MANUALLY OPERABLE DISPENSER
Filed Jan. 19, 1961  2 Sheets-Sheet 1
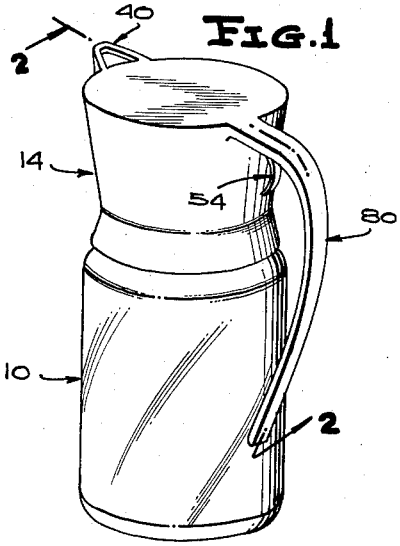
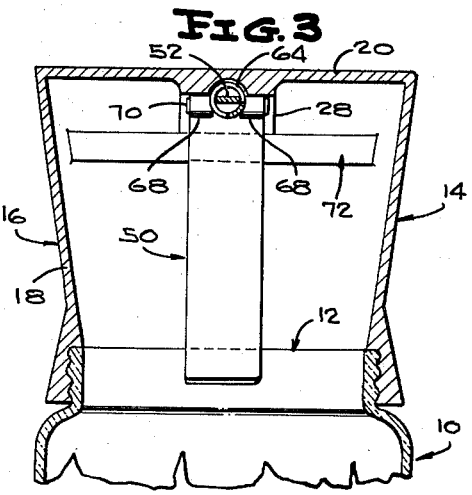
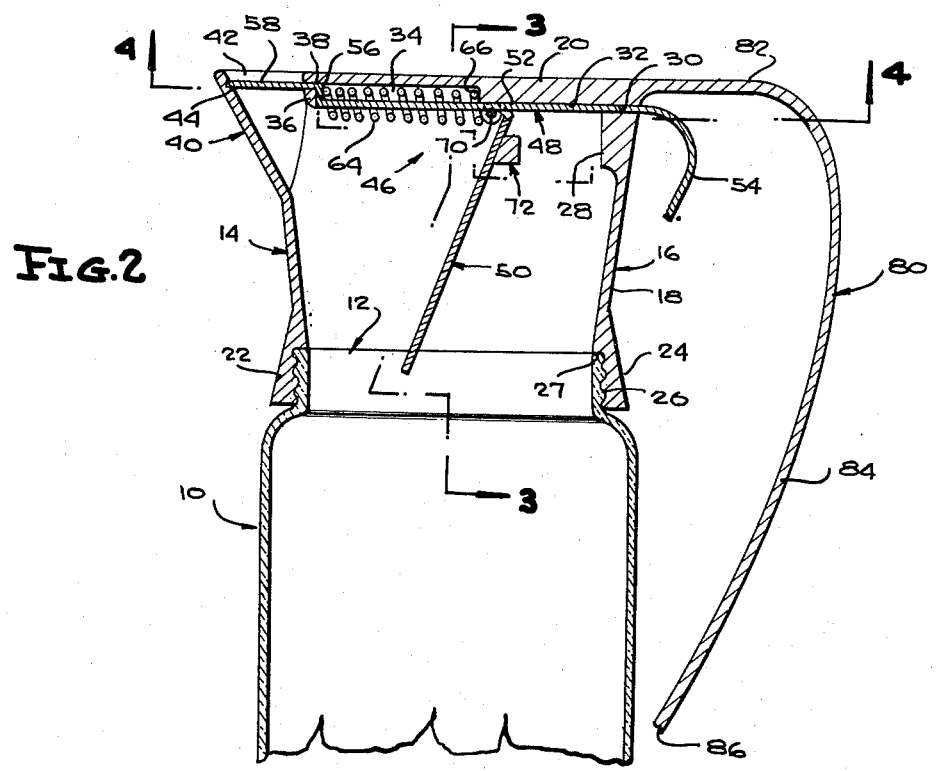
INVENTOR.
ROBERT H. TREGONING
BY
McMorrow, Berman & Davidson
ATTORNEYS

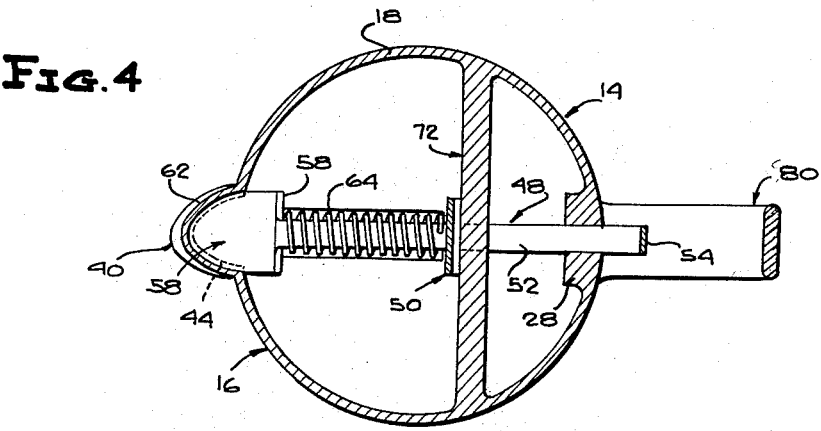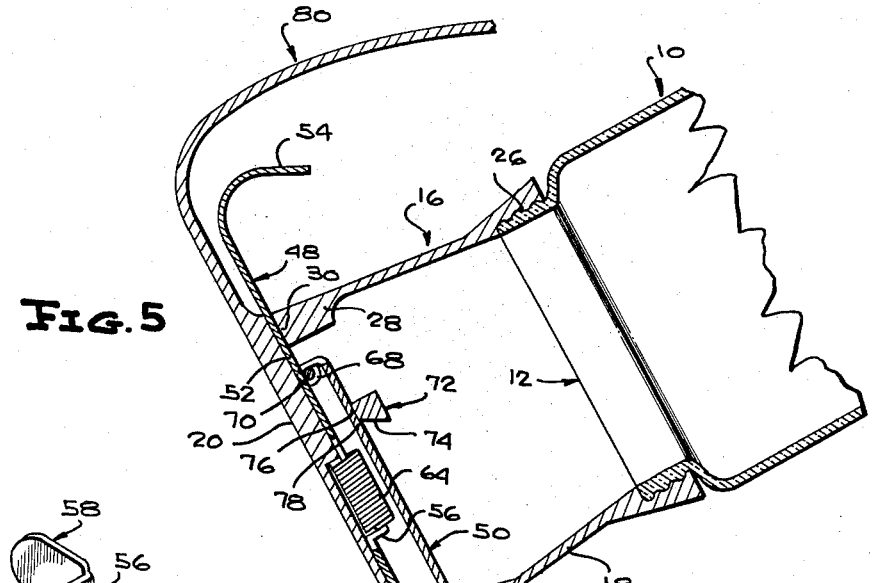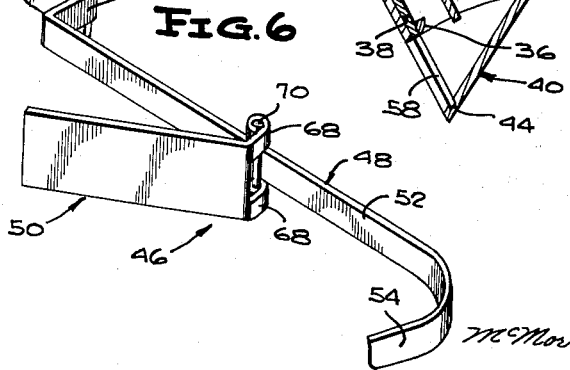

United States Patent Office 3,059,817
Patented Oct. 23, 1962

3,059,817
MANUALLY OPERABLE DISPENSER
Robert H. Tregoning, Foxon Hill Road,
East Haven, Conn.
Filed Jan. 19, 1961, Ser. No. 83,803
6 Claims. (Cl. 222—245)

This invention relates to improvements in manually operable dispensers for granular material, and more particularly to a novel and improved dispenser of this kind, in the form of a screw-on attachment for jars, such as instant coffee jars, and the like.

The primary object of the invention is the provision of a more practical and efficient device of the kind indicated, whose dispensing mechanism includes a spring-pressed slide which serves as a closure, in its extended position, and a pusher which is responsive to manual retraction of the slide for pushing granular material toward and through the dispensing opening of the device.

A further object of the invention is the provision of an inexpensive, uncomplicated, and easily manufactured device of the character indicated above, which is composed of a small number of simple and easily assembled parts, and which can be made in well-finished and rugged forms at relatively low cost.

A still further object of the invention is the provision of a decorative device of the character indicated above, which is adapted to be shaped to simulate the upper part of a coffee pot, so that when the device is installed on such as an instant coffee jar, the resultant appearance is that of an attractive coffee pot.

Other important objects and advantageous features of the invention will be apparent from the following description and the accompanying drawings, wherein, for purposes of illustration only, a specific form of the invention is set forth in detail.

In the drawings:

FIGURE 1 is a perspective view showing a device of the invention installed on a jar;

FIGURE 2 is an enlarged fragmentary vertical longitudinal section taken on the line 2—2 of FIGURE 1, showing the dispensing mechanism in spring-closed position;

FIGURE 3 is a fragmentary vertical transverse section taken on the line 3—3 of FIGURE 2;

FIGURE 4 is a horizontal section taken on the line 5—5 of FIGURE 4;

FIGURE 5 is a view like FIGURE 2, showing the dispenser and jar assembly tilted to pour material therefrom, the dispensing mechanism being in open position; and, FIGURE 6 is a perspective view of the combined slide and pusher of the dispensing mechanism.

Referring in detail to the drawings, wherein like numerals designate like parts throughout the several views, the numeral 10 generally designates a jar, such as an instant coffee jar, having a reduced diameter threaded neck 12, on its upper end, on which is adapted to be installed a dispenser, generally designated 14. It will be understood that the dispensing mechanism of the present invention is applicable also to integral containers whose upper and lower parts are not separable.

The illustrated dispenser 14 comprises an inverted cup-shaped casing 16 having a sidewall 18 and a top wall 20. The sidewall 18 is preferably upwardly flared, as shown in FIGURES 2 and 3, so that the upper end of the casing is larger in diameter than its lower end. The sidewall 18 around the lower end has an enlarged cross section band 22, which preferably has a laterally outwardly and downwardly angled outer surface 24 which flares downwardly to a diameter substantially the same as that of outside diameter of the jar 10. This arrangement makes it appear that the casing sidewall 18 is flared to and merges into the side wall of the jar 10. The casing sidewall 18 is internally and annularly indented, at its lower end, to provide thereat internal screw threads 26 which thread over the neck 12 of the jar 10, and a shoulder 27 to abut the upper end of the neck.

The casing top wall 20 is preferably flat and of substantial cross section; and, at the rear side of the top wall, a thickened, downwardly extending internal block 28 is formed on the sidewall 18 and extends to the top wall, and is provided with a horizontal slide slot 30, which is positioned on a level, below the top wall 20, so that the top wall of the slot is flush with the under surface 32 of the top wall 20, as shown in FIGURE 2. The undersurface 32 is formed with a diametrical recess 34 which extends forwardly from the center of the top wall 20, to a point near to and spaced rearwardly from the forward boundary of the top wall, whereby a short or narrow stop wall 36 is defined, at the forward end of the recess. The stop wall 36 is formed with a horizontal slot 38 whose top wall is flush with the undersurface 32 of the top wall 20, and is aligned with the slide slot 30.

An upper part of the casing sidewall 18, in line with the slot 38 is deformed to provide an upwardly flaring pouring spout 40, having an upper edge 42, which is preferably on a level with the upper surface of the casing top wall 20. The wall of the spout 40 is formed with a continuous horizontal internal groove 44, on a level with the slot 38.

The dispensing mechanism of the device comprises a slide and pusher assembly 46 which comprises an elongated flat rigid slide bar 48, on which is hinged a pusher plate 50. The slide bar 48 and the slot 30 accommodating the same, are narrower than the aperture of the pouring spout 40, as shown in FIGURE 4, and the slot 38 is wider than the slot 30. The slide bar 48 has a straight main portion 52 which slides through the slot 30 in the block 28, and slides against the undersurface 32 of the casing top wall 20, and terminates, at its rear end, in a downwardly and forwardly curved finger-piece or handle 54.

The main portion 52 of the slide bar 48 terminates, at its forward end, in an offset transverse lug 56, which is wider than the main portion 52, and the lug 56 terminates, at its upper end, in a horizontal closure plate 58 which slides against the bottom of the recess 34 as well as against the top wall of the slot 38. The closure plate 58 is preferably a close sliding fit in the slot 38, and has a rounded forward edge 62 adapted to seat conformably in the spout groove 44. These arrangements provide a substantially airtight and spillproof sealing of the pouring spout 40, so that the contents of the jar 10 are maintained in a fresh condition while the dispensing mechanism is in closed position.

The slide bar 48 is urged toward its closed position by an expanding coil spring 64, which is circumposed on the main portion 52 of the slide bar 48, and is compressed between the rear end 66 of the recess 34 and the lug 56.

The pusher plate 50 is elongated and flat and is substantially wider than the main portion 52 of the slide bar 48, and is provided, on its upper end, with a pair of laterally spaced hinge ears 68, which extend forwardly out of the plane of the pusher plate and are journalled on the ends of a hinge pin 70 which is suitably fixed to the underside of the main portion 52, at a location substantially midway between the ends of the main portion.

A cam bar 72 is fixed to and extends between opposed portions of the casing sidewall 18, at a location just behind and parallel to the hinge pin 70, in the closed position of the slide bar 48, as shown in FIGURE 2. The cam bar 72 has a rearwardly and upwardly angled forward surface 74, on its forward side, and a top surface 76 which is spaced downwardly from the slide bar 48, and the surfaces 74 and 76 intersect in a corner 78. With the slide bar 48 in its closed position, the pusher plate 50 occupies a pendant position and bears against the cam surface 74, as shown in FIGURE 2.

Pulling rearwardly on the handle 54 moves the slide bar 48 rearwardly against the resistance of the spring 64, and withdraws the closure plate 58 from across the pouring spout 40, and causes upward and forward swinging of the pusher plate 50 by reason of its rearward movement in contact with the corner 78 of the cam bar 72. As shown in FIGURE 5, full retraction of the slide bar 48 moves the pusher plate 50 to a horizontal position, wherein the pusher plate rests upon the top surface 76 of the cam bar 72. Thus, opening of the pouring spout 40 is accompanied by upward and forward swinging of the pusher plate 50, so that granular material, present in the casing due to forward tilting of the dispenser and jar assembly, is pushed by the pusher plate 50 toward and through the spout 40. Upon release of the handle 54, the spring 64 extends and pushes the slide bar forwardly so that the forward end 66 of the closure plate engages in the spout groove 44 and the pusher plate subsides gravitationally to a pendant position in engagement with the forward surface 74 of the cam bar 72.

The dispenser 14 is provided with a handle 80 which is fixed to the rear side of the casing and comprises a horizontal upper portion 82 which is fixed to and extends rearwardly from the casing sidewall 18 on a level with a top wall 20, and terminates, at its rear end, in a downwardly extending, vertically elongated portion 84. The vertical portion 84 reaches below the dispenser 14 to the jar 10 and has a lower end 86 which is located close to the rear side of the jar 10.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A dispenser comprising a casing having a sidewall and a top wall, said sidewall having a slide slot at the underside of the top wall, a slide bar sliding through said slot and extending across the interior of the casing, spring means connected between the slide bar and the casing and urging said slide bar toward one side of the casing and to its closed position, the sidewall at said one side of the casing having a pouring spout, said slide bar having a closure plate on one end thereof adapted to extend across the spout to constitute the closed position of the slide bar, said slide bar having a handle on its other end outside the casing, a normally pendant pusher plate having an upper end and a lower end, said pusher plate being hinged at its upper end to the slide bar, inside the casing, and a horizontal cam bar extending across the interior of the casing and spaced below the slide bar, said cam bar being engaged with the side of the pusher plate remote from the spout.

2. A dispenser comprising a casing having a sidewall and a top wall, said sidewall having a slide slot at the underside of the top wall, a slide bar sliding through said slot and extending across the interior of the casing, spring means connected between the slide bar and the casing and urging said slide bar toward one side of the casing and to its closed position, the sidewall at said one side of the casing having a pouring spout, said slide bar having a closure plate on one end thereof adapted to extend across the spout to constitute the closed position of the slide bar, said slide bar having a handle on its other end outside the casing, a normally pendant pusher plate having an upper end and a lower end, said pusher plate being hinged at its upper end to the slide bar inside the casing, and a horizontal cam bar extending across the interior of the casing and spaced below the slide bar, said cam bar being engaged with the side of the pusher plate remote from the spout, and a handle fixed on the casing sidewall at the said other side of the casing and extending downwardly along the casing.

3. A dispenser comprising a casing having a sidewall and a top wall, said sidewall having a slide slot at the underside of the top wall, a slide bar sliding through said slot and extending across the interior of the casing, spring means connected between the slide bar and the casing and urging said slide bar toward one side of the casing and to its closed position, the side wall of said one side of the casing having a pouring spout, said slide bar having a closure plate on one end thereof adapted to extend across the spout to constitute the closed position of the slide bar, said slide bar having a handle on its other end outside the casing, a normally pendant pusher plate having an upper end and a lower end, said pusher plate being hinged at its upper end to the slide bar, and a horizontal cam bar extending across the interior of the casing and spaced below the slide bar, said cam bar being engaged with the side of the pusher plate remote from the spout, said casing having an open lower end, and a jar having a neck removably and securably engaged with the lower end of the casing.

4. A dispenser comprising a casing having a sidewall and a top wall, said sidewall having forward and rear sides, a pouring spout formed on and extending forwardly from said forward side, said top wall having an undersurface, the rear side of the sidewall being formed with a slide slot at the undersurface of the top wall, said undersurface having a recess therein extending forwardly from an intermediate part of the top wall to a point adjacent to the forward side of the sidewall and defining a stop wall, said stop wall being formed with a slot at the undersurface of the top wall, a slide bar slidably supported through said slide slot, said slide bar having a main portion slidably engaged with the undersurface of the top wall, said main portion terminating at its rear end in a handle outside of the casing and terminating at its forward end in an offset positioned in said recess, a closure plate on and extending forwardly from the upper end of said offset and adapted to extend across and close said pouring spout, expanding spring means in said recess and connected to said main portion and the top wall and urging said main portion forwardly to closed position, a normally pendant pusher plate hinged at its upper end to an intermediate part of said main portion and having a rear side, and a cam bar extending across the interior of the casing with which the rear side of the pusher plate is engaged.

5. A dispenser comprising a casing having a sidewall and a top wall, said sidewall having forward and rear sides, a pouring spout formed on and extending forwardly from said forward side, said top wall having an undersurface, the rear side of the sidewall being formed with a slide slot at the undersurface of the top wall, said undersurface having a recess therein extending forwardly from an intermediate part of the top wall, to a point adjacent to the forward side of the sidewall and defining a stop wall, said stop wall being formed with a slot at the undersurface of the top wall, a slide bar slidably supported through said slide slot, said slide bar having a main portion slidably engaged with the undersurface of the top wall, said main portion terminating at its rear end in a handle outside of the casing and terminating at its forward end in an offset positioned in said recess, a closure plate on and extending forwardly from the upper end of said offset and adapted to extend across and close said pouring spout, expanding spring means in said recess and connected to said main portion and the top wall and urging said main portion forwardly to closed position, a normally pendant pusher plate hinged at its upper end to an intermediate part of said main portion and having a rear side, and a cam bar extending across the interior of the casing with which the rear side of the pusher plate is engaged, said spout having an internal groove and said closure plate having a forward edge adapted to seat in the groove in the closed position of the slide bar.

6. A dispenser comprising a casing having a sidewall and top wall, said sidewall having forward and rear sides, a pouring spout formed on and extending forwardly from said forward side, said top wall having an undersurface, the rear side of the sidewall being formed with a slide slot at the undersurface of the top wall, said undersurface having a recess therein extending forwardly from an intermediate part of the top wall to a point adjacent to the forward side of the sidewall and defining a stop wall, said stop wall being formed with a slot at the undersurface of the top wall, a slide bar slidably supported through said slide slot, said slide bar having a main portion slidably engaged with the undersurface of the top wall, said main portion terminating at its rear end in a handle outside of the casing and terminating at its forward end in an offset positioned in said recess, a closure plate on and extending forwardly from the upper end of said offset and adapted to extend across and close said pouring spout, expanding spring means in said recess and connected to said main portion and the top wall and urging said main portion forwardly to closed position, a normally pendant pusher plate hinged at its upper end to an intermediate part of said main portion and having a rear side, and a cam bar extending across the interior of the casing with which the rear side of the pusher plate is engaged, said spring means comprising a coil spring circumposed on the main portion of the slide bar, said spring being compressed between said offset and the rear end of the recess.

References Cited in the file of this patent
UNITED STATES PATENTS

| | | |
|---|---|---|
| 1,383,935 | Guill | July 5, 1921 |
| 2,328,564 | Lightfoot et al. | Sept. 7, 1943 |
| 2,353,132 | Frank | July 11, 1944 |
| 2,544,062 | Bernhardt | Mar. 7, 1951 |
| 2,554,293 | Brown | May 22, 1951 |